(12) United States Patent
Malas et al.

(10) Patent No.: US 8,350,749 B1
(45) Date of Patent: Jan. 8, 2013

(54) RADAR SIGNATURE DATABASE VALIDATION FOR AUTOMATIC TARGET RECOGNITION

(75) Inventors: John Malas, Centerville, OH (US); Krishna Pasala, Centerville, OH (US); Usha M. Pasala, legal representative, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 283 days.

(21) Appl. No.: 12/770,211

(22) Filed: Apr. 29, 2010

Related U.S. Application Data

(60) Provisional application No. 61/173,694, filed on Apr. 29, 2009.

(51) Int. Cl.
*G01S 7/41* (2006.01)
(52) U.S. Cl. .......................................... 342/90; 342/195
(58) Field of Classification Search .................... 342/90, 342/195
See application file for complete search history.

(56) References Cited

U.S. PATENT DOCUMENTS

| | | | |
|---|---|---|---|
| 6,337,654 B1 * | 1/2002 | Richardson et al. ............. 342/90 |
| 7,002,509 B2 * | 2/2006 | Karlsson .......................... 342/90 |
| 7,692,573 B1 * | 4/2010 | Funk ................................ 342/90 |
| 8,026,844 B2 * | 9/2011 | Fox et al. ....................... 342/173 |
| 8,085,186 B1 * | 12/2011 | Malakian et al. ................ 342/95 |
| 8,242,952 B1 * | 8/2012 | Barr ................................ 342/90 |
| 8,243,989 B2 * | 8/2012 | Vendrig ........................ 382/103 |
| 8,244,469 B2 * | 8/2012 | Cheung et al. ................. 701/519 |
| 8,259,006 B2 * | 9/2012 | Culkin ........................... 342/195 |
| 2003/0164792 A1 * | 9/2003 | Jahangir et al. .................. 342/90 |
| 2006/0284761 A1 * | 12/2006 | Picard ........................... 342/160 |
| 2007/0139251 A1 * | 6/2007 | Shu .............................. 342/25 R |
| 2007/0146195 A1 * | 6/2007 | Wallenberg et al. ............. 342/52 |
| 2009/0002224 A1 * | 1/2009 | Khatib et al. ................ 342/25 R |
| 2010/0109938 A1 * | 5/2010 | Oswald et al. ................... 342/90 |
| 2011/0241928 A1 * | 10/2011 | Oswald et al. ................... 342/90 |

* cited by examiner

*Primary Examiner* — John B Sotomayor
(74) *Attorney, Agent, or Firm* — AFMCLO/JAZ; Jeff Moore; Rebecca Greendyke

(57) ABSTRACT

A method for testing and/or validating the suitability of a multi-radar signature database to be used on radar systems having automatic target recognition. The database may include measured field data and/or modeled synthetic data. The technique allows field data to be compared to the synthetic data using modal mutual information.

8 Claims, 10 Drawing Sheets

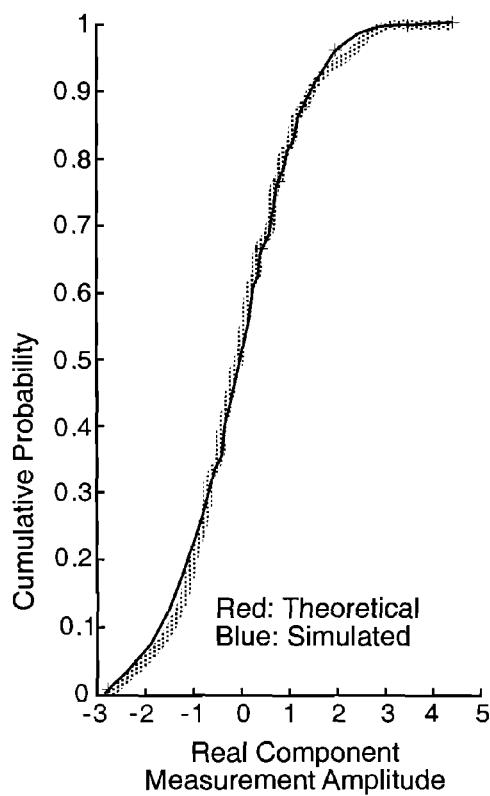 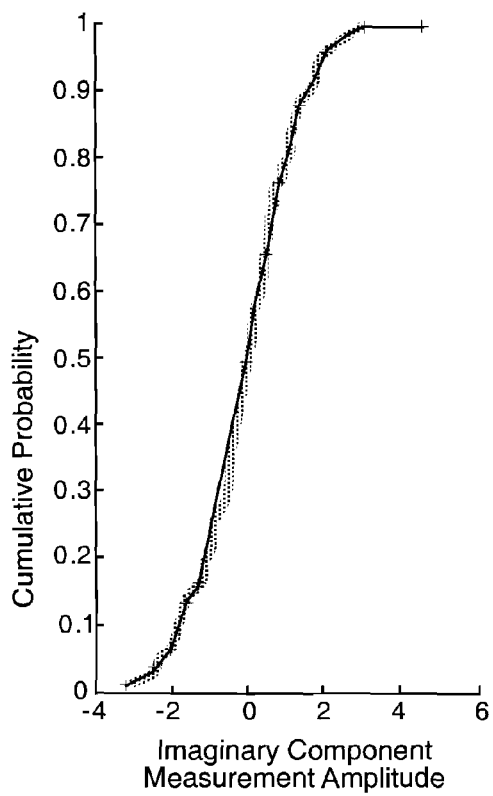
*Fig. 3a*  *Fig. 3b*

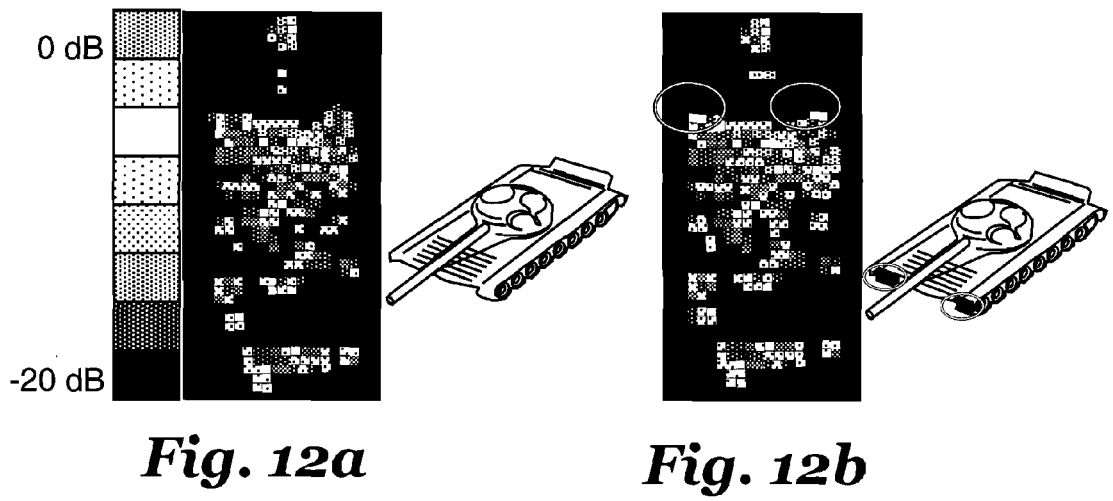
Fig. 12a  Fig. 12b
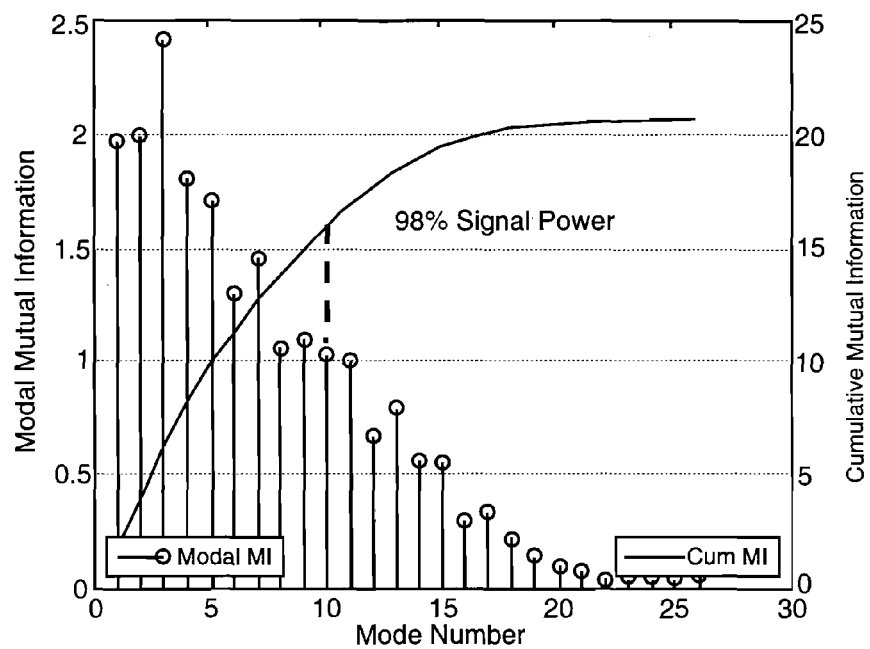
Fig. 13

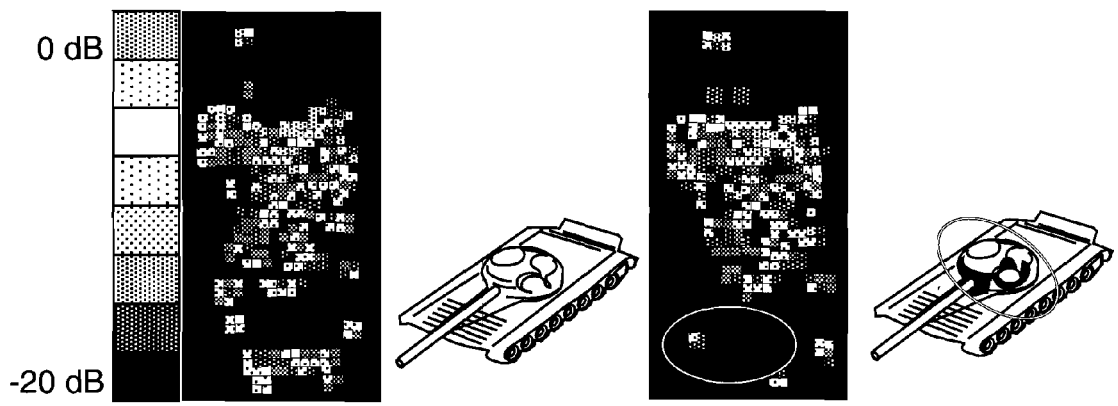
*Fig. 14a*  *Fig. 14b*
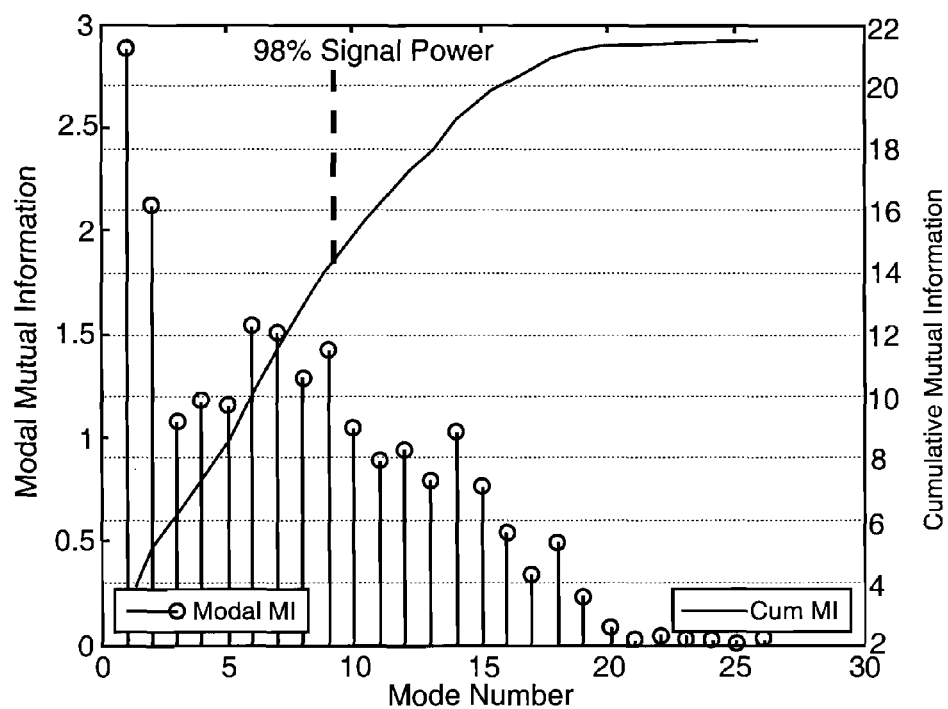
*Fig. 15*

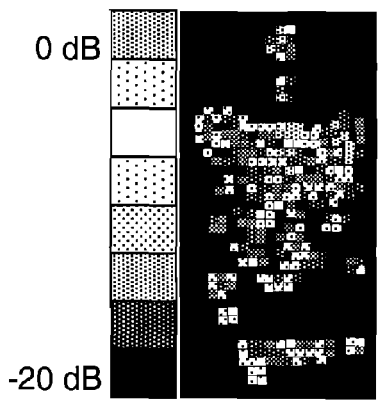 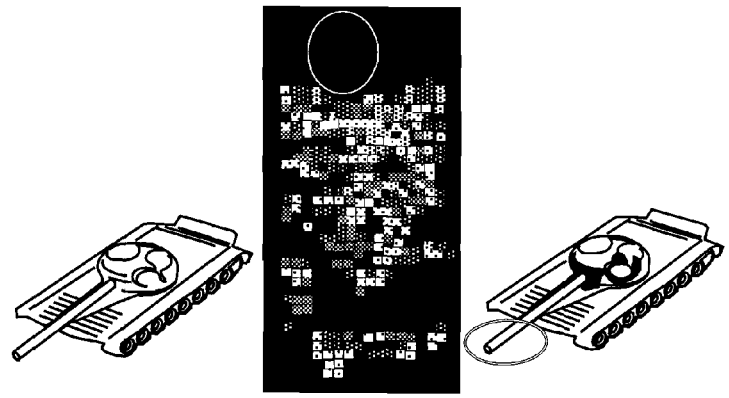
Fig. 16a  Fig. 16b
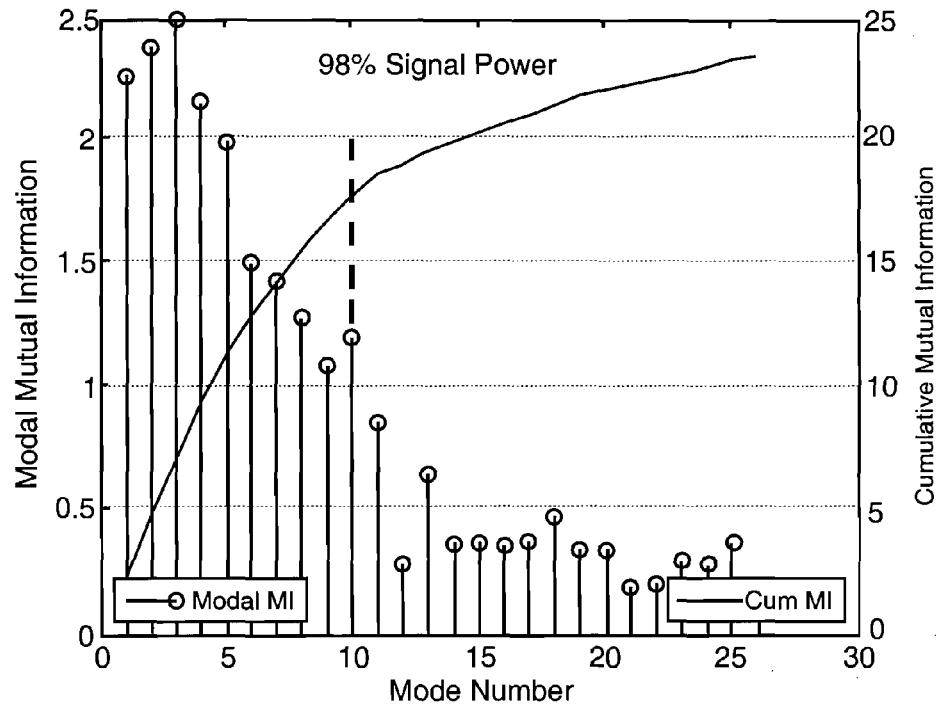
Fig. 17

RADAR SIGNATURE DATABASE VALIDATION FOR AUTOMATIC TARGET RECOGNITION

PRIORITY

This application claims priority from the USPTO provisional patent application entitled "Radar Signature Database Validation for ATR" filed on Apr. 29, 2009, Ser. No. 61/173,694 which is hereby incorporated herein by reference.

RIGHTS OF THE GOVERNMENT

The invention described herein may be manufactured and used by or for the Government of the United States for all governmental purposes without the payment of any royalty.

BACKGROUND OF THE INVENTION

The ability to make radar signature databases portable for use within similar sensor systems may be critical to the affordability of future airborne signature exploitation systems. The capability to hybridize measured and synthetic signature database components may maximize the impact of the investment required to build complex radar signature databases. Radar target scattering mechanisms may be modeled and the signature signal model analyzed as a random process to enable portability and hybridization. Modal mutual information may be developed as a measure of similarity to compare measured field data to modeled synthetic data. The inherent qualities of mutual information to be used in the context of the automatic target recognition problem may be demonstrated using synthetic signature sets comprised of both "similar targets" and "dissimilar targets."

Signature exploitation systems are of ever increasing importance both in air-to-air and air-to-ground sensor systems. Successful implementation of these systems often requires a robust and integrated signature database for training exploitation algorithms. Signature training databases should represent the radar measured signature process across a wide range of target articulations and configurations as well as under many operating conditions including clutter, obscuration, and other sources of RF interference. It is also useful to have signature databases that are portable for use in similar sensor applications. For example, it is desired that airborne radar systems associated with a type of aircraft be able to share a common radar signature database. Construction of a signature database based entirely on measurements is expensive and can be an impractical proposition. It is possible to construct a signature database using electromagnetic scattering codes.

However, given the complexity of typical targets including personnel carriers, tanks, aircrafts, and missiles etc., and the challenge of modeling a variety of electromagnetic scattering phenomena ranging from specular reflection to edge diffraction, smooth surface diffraction etc., computation of signatures with sufficient accuracy is a challenging task. Furthermore, it needs to be established that the computed signatures are consistent with measured signatures. The validation of the computed or surrogate sensor signature process enables the expanded use of multi-source signature data for algorithm training within ongoing automatic target recognition (ATR) theory efforts, nearly all of which depend on a valid characterization of the signature scattering model for all targets of interest.

The use of high range resolution (HRR) radar measurements has been useful in the support of research and study of signature exploitation capability within airborne platforms. In view of the uncertainties in the aspect angle of the target, the high range resolution signature may be considered to be a random vector. Given the changing geometry relative to the target within a typical radar measurement interval, the statistics associated with the high range resolution random vector are often time varying. Therefore, the measured high range resolution signature of the target at a given time "t" is a realization of a multidimensional random process (time varying random vector). If the target statistics are assumed to be stationary (constant with time), the sample signatures associated with this random vector correspond to a range of aspect angles in a small window about this reference.

The present invention compares two different high range resolution signature databases within the context of validation similarity requirements for automatic target recognition systems.

The problem of validation is quite different from the design of target recognition algorithms. In the case of automatic target recognition algorithms, a signature measured under field conditions (which may be considered to be a sample realization of a random process) is compared to the signature random process corresponding to the different target classes of interest comprising a database. Unlike the automatic target recognition problem, the database similarity problem (validation) involves the comparison of two random signature processes.

SUMMARY OF THE INVENTION

An automatic target recognition radar database validation including a first database associated with field measured data and a second database associated with synthetic data. The second database compared with the first database using modal mutual information calculations. The calculations of the modal mutual information for dissimilar targets are well separated from similar targets throughout the database, validating the synthetic database for automatic target recognition radar use.

BRIEF DESCRIPTION OF THE DRAWINGS

FIG. 3a and FIG. 3b are comparisons of Kolmogorov-Smirnov test results and illustrates the agreement between the theoretical and simulated Gaussian cumulative probability distributions.

FIG. 12a is a Two Dimensional Image of T-72 Tank, 0° Az/15° El Target Aspect Angle with fender scattering.

FIG. 12b is a Two Dimensional Image of T-72 Tank, 0° Az/15° El Target Aspect Angle without fender scattering.

FIG. 13 is a Modal MI and Cumulative MI for T-72 with Fender Scattering and T-72 without Fender Scattering, Cumulative MI of 16 Nats FIG. 14a is a two Dimensional Image of T-72 Tank, 0° Az/15° El Aspect Angle With Fuel Barrel Scattering.

FIG. 14b is a two Dimensional Image of T-72 Tank, 0° Az/15° El Aspect Angle Without Fuel Barrel Scattering.

FIG. 15 is a graphical illustration of Modal MI and Cumulative MI for Baseline T-72 Scattering and Baseline T-72 without Fuel Barrel Scattering, Cumulative MI of 14 Nats.

FIG. 16a is a two Dimensional Image of T-72 Tank, 0° Az/15° El Aspect Angle With Gun Barrel Scattering.

FIG. 16b is a two Dimensional Image of T-72 Tank, 0° Az/15° El Aspect Angle Without Gun Barrel Scattering.

FIG. 17 is a graphical illustration of Modal MI and Cumulative MI for Baseline T-72 with Gun Barrel Scattering and T-72 without Gun Barrel Scattering, Cumulative MI of 12 Nats.

DETAILED DESCRIPTION

Figure 1:
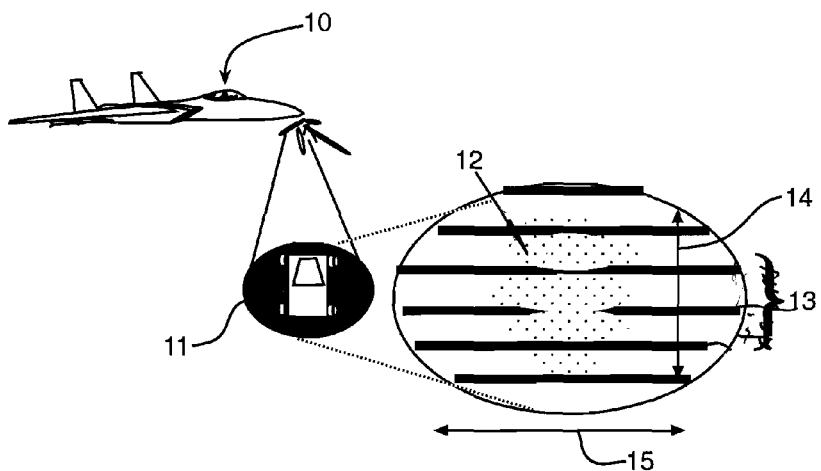
FIG. 1 is diagram of target scatterers extended in range and cross range.

The present invention uses the characterization of target signature statistics available in J. C. Principe, D. Xu, Q. Zhao, J. W. Fisher "Learning form Examples with Information Theoretic Criteria", Journal of VLSI Signal Processing 26, 61-77, 2000. This and all other references are herein incorporated by reference. Xu, Zhao, and Fisher present a framework for the present invention. D. R. Fuhrmann and G. San Antonio. "Transmit beam forming for MIMO radar systems using partial signal correlation," IEEE Transactions Aerospace Electronics Systems Vol. 43, no. 4, October 2007; describes radars with a new architecture referred to as the MIMO (Multiple Input Multiple Output) radar. The present invention provides a multi-radar signature database for at least two radar systems having automatic target recognition using a synthetic signature set automatically compared with the target signature to provide automatic target recognition based upon a modal mutual information calculation.

To a great extent the referenced work has either focused on improving sensor and waveform design for maximum target information measurement or has attempted to develop an information theoretic approach to performance prediction and decision rule design. Much of the above referenced work has focused on areas outside the validation and assessment of information associated with the random signature processes within the radar target training database.

J. Malas, K. Pasala, "Information Theory Based Signature Analysis", Proceedings of 2007 IEEE Aerospace Conference, March 2007 introduced the use of mutual information as a similarity measure for use in radar signature database validation. One aspect of the present invention is the development and demonstration of modal mutual information (MMI) as a physics based radar signature similarity measure compatible within the automatic target recognition problem context. Techniques are developed with the present invention to avoid numerical issues in the computation of mutual information. "Numerical issues" include the reduction of false positives, false negatives, and inconclusive results. One of more of which may be reduced with the present invention.

Modal mutual information is a modal part of the mutual information. The choice of mutual information as a measure of signature database similarity is based on several unique characteristics of mutual information. Relative entropy is a measure of the distance between two distributions. The relative entropy $D(p\|q)$ is a measure of the inefficiency of assuming that a distribution is q when the true distribution is p.

Modal mutual information provides a mathematical computational approach that avoids or surmounts the computational barriers of other methods. Such barriers may include infinity failures or calculations that may result in more false positives, false negatives or indecisive results than obtainable with the present invention.

Mutual information is the relative entropy between the joint distribution $f(p,q)$ and the product of the respective marginal distributions $f(p) \cdot f(q)$. The mutual information between p and q will be zero if and in one embodiment only if p=q and represents the reduction in uncertainty in one random variable given the knowledge of another. Mutual information is a measure of the dependence between random variables and is a more general (contains all the statistics) measure of similarity.

In contrast, a simple cross correlation only involves the second order statistics of the variables under test. Mutual information (via statistical dependence) can be used to determine the degree of common "information" within the physical scattering that is present in both of the random signature processes.

While techniques including maximum likelihood tests operate within the full dimensionality of the data, mutual information operates within the "typical set" of the signature subspace which is related the entropy of the signature processes. Attributes of entropy based methods and mutual information offer the potential to measure similarity within this lower dimensional space. The ability to relate this generalized mutual information similarity measure directly to Bayes error through an information theoretic systems theory is a significant strength of this approach.

In one embodiment of the present invention modal mutual information is used to compare two high range resolution signature random processes $\vec{X}$ and $\vec{Y}$. High range resolution signatures of complex extended targets may be associated with complex random processes that are circular Gaussian. Numerical computation of mutual information with the prior art can be unstable due to the singularities that exist when the individual or joint correlation matrices of $\vec{X}$ and/or $\vec{Y}$ are rank deficient or ill conditioned. The concept of modal mutual information is introduced to overcome these numerical problems and obtain a stable computed value of mutual information between $\vec{X}$ and $\vec{Y}$. Using electromagnetic prediction codes, high range resolution signature processes and Y are computed for a number of different target classes at a sampled range of aspect angles.

These experimental examples are designed to demonstrate the implementation of modal mutual information and more importantly, to demonstrate that the strength of mutual information may be used successfully to provide multi-radar signature database for at least two radar systems having automatic target recognition of a target having a target signature.

The database includes measured field data and modeled synthetic data which are compared using the modal mutual information. The field data compared to the synthetic data mathematically combined to create a synthetic signature set using modal mutual information. In one embodiment this is high resolution data and/or two high range resolution signatures. The synthetic signature set in one embodiment includes both similar targets and dissimilar targets. A synthetic database may include surrogate data, measured data, model data or any combination thereof. The synthetic signature set automatically compared with the target signature to provide automatic target recognition based upon a modal mutual information calculation.

An automatic target recognition radar database validation may include a first database associated with field measured data and a second database associated with synthetic data. The second database may be compared with the first database using modal mutual information calculations. The calculations of the modal mutual information for a dissimilar target are well separated from a similar targets throughout the database, validating the synthetic database for automatic target recognition radar use. There may be other uses for the particular application of modal mutual information calculations where overcoming the mathematical barriers are needed to reach reliable solutions.

The comparison signature processes is preferably based on the underlying common physical scattering information. Modeled variants of the actual target physical scattering are preferably used to form the cases for testing automatic target recognition.

A random signature process may be formed through a mapping of high range resolution signature to target azimuth/elevation aspect angle locations distributed within a local window about a center reference aspect angle to the target. While not guaranteed one-to-one, the mapping is sufficient to represent the support of the function.

When the two signature processes $\vec{X}$ and $\vec{Y}$ correspond to two different target classes, the cumulative modal mutual information is near zero even when they appear to be "close" and could be considered a "confuser" based on conventional geometric or feature based measures. A confuser may include a false positive, false negative or inconclusive determination. The confusion may be in part because the high range resolution signature processes of two different target lasses are independent and the cumulative modal mutual information between independent processes is zero, even when they appear "close" by conventional measures.

When the signature processes correspond to the same target class, but with variations, the cumulative modal mutual information is high. This is demonstrated by determining the modal mutual information between the signature processes of a target and its variants. The variants are obtained, for example, by removing certain physical features from the original target. A number of such variants are created. Cumulative modal mutual information is consistently high between signatures corresponding to targets with in-class variations. Cumulative modal mutual information is consistently low between signatures corresponding to targets with out of class variations. Thus the modal mutual information developed herein can be used to determine if two signature processes, obtained by two different methods (measured and synthetic, for example) correspond to in-class or out of class targets.

The electromagnetic phenomenology of the signature process together with the characteristics of the sensor may be used to create a signal model for the high range resolution signature. In the high frequency regime used to obtain high range resolution signatures of the target may be approximated as a collection of scattering centers valid over a limited aspect window and frequency band.

These scattering centers may be considered to be localized to a point and may represent a variety of scattering phenomena ranging from specular reflection to diffraction phenomena including as edge and tip diffraction. The fields radiated by these point scatterers depend upon both temporal and spatial frequencies (angular dependence). Since the radar illuminating the target has finite bandwidth and is a one dimensional imaging system, the target is seen as a collection of contiguous swaths of range, with each range swath corresponding to a particular range. The extent of each range swath, range resolution, depends upon the signal bandwidth. For a typical extended target of interest, each range swath contains a number of scattering centers which can be widely spaced in cross-range as shown in FIG. 1.

FIG. 1 shows an aircraft 10, detecting a tank 11 to produce tank scattering 12 with range bins 13, a down range dimension 14 and a cross range dimension 15.

The electromagnetic field obtained as a result of the interference of the scattered fields from the scattering centers appears as the signal corresponding to the range bin 13 of the high range resolution signature.

Figure 2:
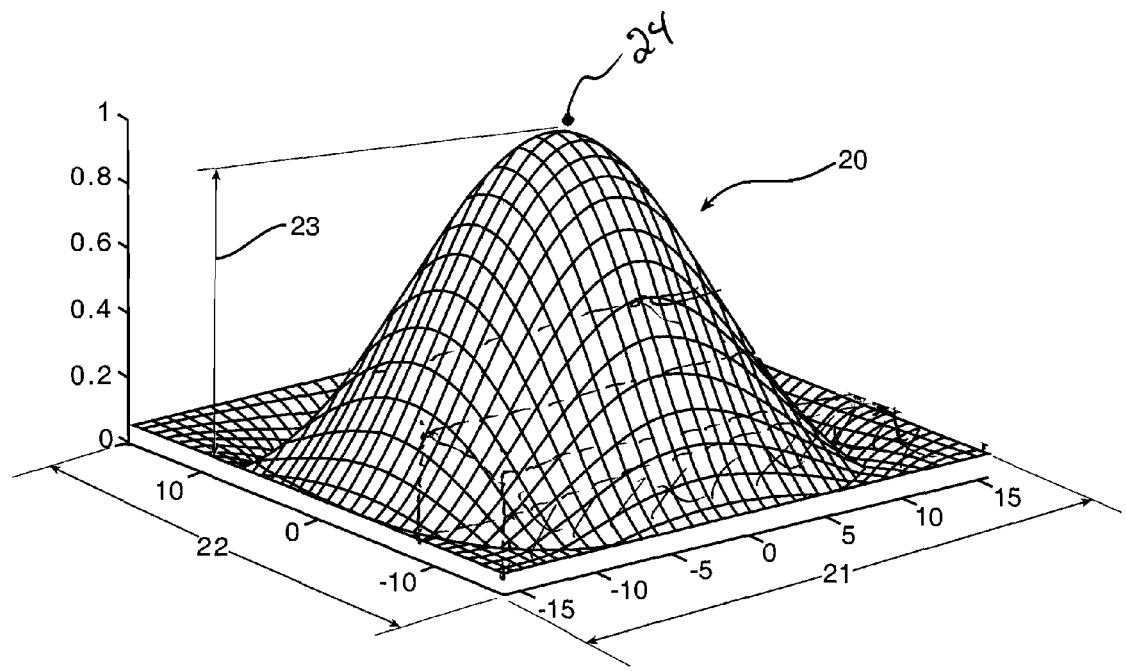
FIG. 2 is a theoretical point spread function example for the band limited response.

The high range resolution signature may be considered a one dimensional image of the reflectivity (or scattering) profile of the target for a given look angle and bandwidth. Due to finite bandwidth of a practical radar system, the point spread function is not an impulse function. As shown in FIG. 2, a mainlobe 20 of finite width 21, length 22 and height 23 sets a limit on the range resolution achievable, and sidelobes (not shown). The mainlobe 20 and sidelobes have decreasing amplitude in all directions from a peak 24.

Even when the scattering phenomenon is localized to a specific range bin, this phenomenon will manifest as reflectivity that is present in other range bins as well. Therefore every point target at any specific range location will present itself as collateral scattering phenomenon at other ranges. The value of the reflectivity at the actual location is defined as a "signal" and at all other locations as "noise."

On an actual or non-scattering center approximated target, this "noise" would comprise the effects of non-localized scattering at any given time delay as well as the windowed sidelobe response of localized scattering.

Hence, at any given range location, the observed data is comprised of a component due to the coherent interference of all the mainlobe point-like target phenomenon present at that location (the signal component) and a component that is the sum total of the collateral contributions (side lobes) that occur in range bins other than the range bin of interest. This latter component may be referred to as noise and the observed data in the $i^{th}$ range bin may be modeled as in Equation (Eq.) (1).

$$X_i = S_i + N_i \quad (1)$$

The signal component at any range bin is due in part to the interference of the scattered fields from all the scattering centers distributed in cross range over several wavelengths and may be expressed as in Eq. (2).

$$V_i = \sum_{n=1}^{N} A_n e^{j\phi_n}. \quad (2)$$

Here $A_n$ and $\phi_n$ are the amplitude and modulo $2\pi$ phase of the $n^{th}$ scatter in the $i^{th}$ range bin respectively. $\phi_n$ is a function of the look angle and frequency and may be modeled as a random variable uniformly distributed between $[0, 2\pi]$. Given that $\sigma_{A_i}^2$ and $\mu_{A_i}$ are the variance and the mean of the amplitudes, it can be readily shown that as $N \to \infty$ both real and imaginary parts of $V_i$ are zero mean Gaussian random variables with a variance given in Eq. (3).

$$\sigma_i^2 = \frac{N \cdot (\sigma_{A_i}^2 + \mu_{A_i}^2)}{2} \qquad (3)$$

The theoretical Gaussian shape of the real and imaginary components of the signature (afforded by the central limit theorem) meets the criteria for parametric estimation and as such the Kolmogorov-Smirnov test (K-S test) is employed to verify the Gaussian shape assumption. The K-S statistic indicates the level of agreement between two continuous distributions that are fully specified (location, scale and shape). At one foot resolution, these test results indicate that there are sufficient numbers of scatterers contributing within each range bin to validate the assumption that for electrically large targets with many scattering sources extended in cross range, the probability density functions (pdfs) associated with the real and imaginary signature data are in fact Gaussian and zero mean. An example of the real and imaginary components of the signal within an high range resolution range bin conforming to the Gaussian distribution is provided in FIG. 3 which shows the Kolmogorov-Smirnov test Results of high range resolution. The Signature Range Bin Illustrates the agreement between the theoretical and simulated Gaussian Cumulative Probability Distributions.

Hence, given the appropriate bandwidth and target characteristics outlined above, both the signal and noise components of the signal in any range bin are assumed to be complex Gaussian distributed random variables. The signal component is obtained from the interference of the mainlobes of the point spread functions and the noise components are obtained from the sidelobes of the point spread functions. The high range resolution signature vector may be modeled in the vector version of Eq. (3) as shown in Eq. (4).

$$\vec{X} = \vec{S} + \vec{N} \qquad (4)$$

While the ease of analysis afforded by the Gaussian distribution is helpful in developing concepts pictured below, all results produced using continuous vector random variables can be reproduced using discrete random variables.

The variation in signature phenomenology due to the uncertainties in the aspect angle are captured in the signal model illustrating that the high range resolution signature may be viewed as a random process. All random processes under analysis herein are assumed to be stationary. The covariance matrix of the random process and it's representation in terms of eigenmodes are used in the following experimental examples.

A small window of aspect angles, typically less than 5°×5° in azimuth and elevation around a specified aspect, is experimentally chosen for targets of interest at X-band frequencies (8-12 GHz) in the following example. The targets are electrically large with dimensions in range and cross-range of many wavelengths. An ensemble of complex high range resolution signatures, $$[\vec{x}_l]_{l=1}^{L},$$

corresponding to a number of aspect angles distributed in this window are used to estimate (unbiased) the covariance matrix $$\hat{C} = \frac{1}{(L-1)} \sum_{l=1}^{L} \vec{x}_l \cdot \vec{x}_l^H.$$

The factor (L−1) can be changed to L for the maximum Likelihood estimator of the Gaussian case. A spectral decomposition of this covariance matrix may be expressed as given in equation (5).

$$\hat{C} = \sum_{k=1}^{M} \lambda_k \cdot \hat{q}_k \cdot \hat{q}_k^H \qquad (5)$$

Figure 4:
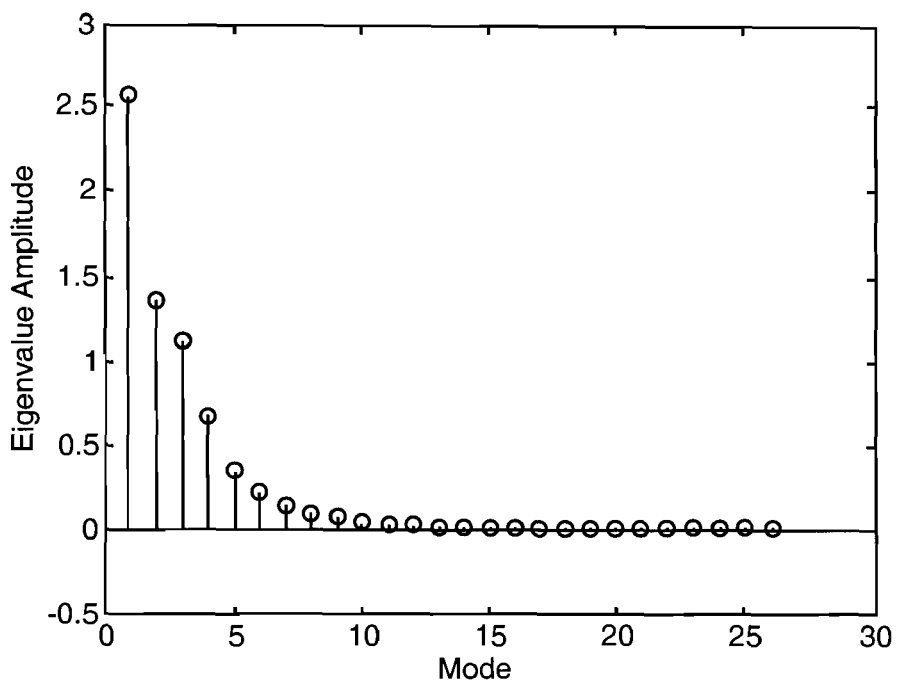
FIG. 4 is an Eigenspectrum illustration for BTR-70 ground target in 2.5 AZ×2.5 EL degree spatial sampling window; 100 signatures uniformly distributed in AZ/EL, 1 ft. resolution.
Figure 5:
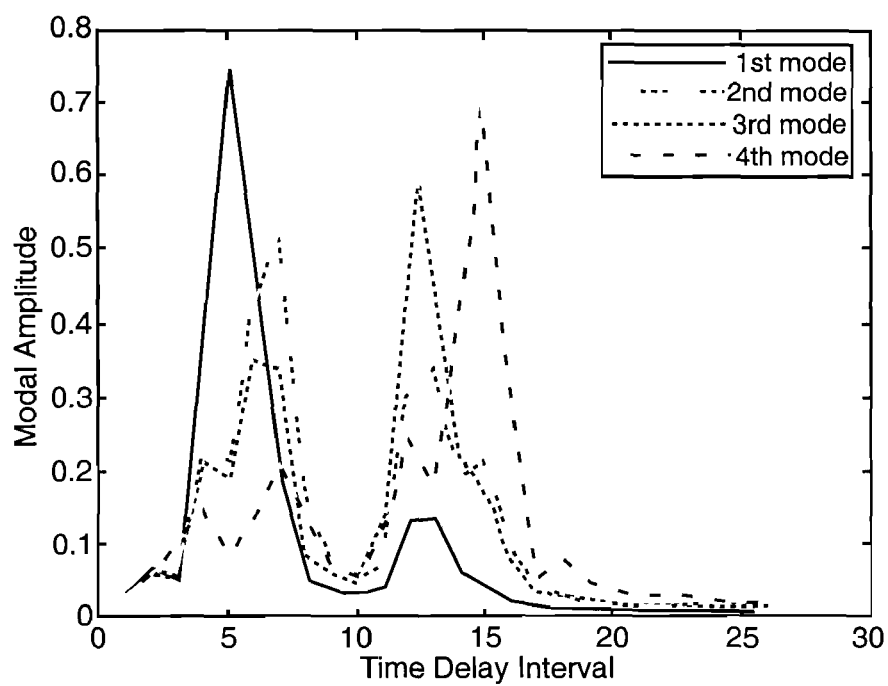
FIG. 5 is an eigenmodes illustration for BTR-70 ground target in 2.5 Az×2.5 El degree spatial.

Here $\lambda_k$ and $\hat{q}_k$ represent the eigenvalues and the corresponding eigenvectors. M is the size of the correlation matrix and equals the number of range bins. FIG. 4 shows the eigenspectrum for such a window for the BTR-70 target (armored personnel carrier) in 2.5 AZ×2.5 EL degree spatial sampling window; 100 signatures uniformly distributed in AZ/EL, 1 ft. resolution. It suggests the possibility of a decomposition of the signature space into signal and noise subspaces consistent with the signal model defined by equation (4). The eigenspectrum for BTR-70 ground target in FIG. 5 shows some of the eigenmodes associated with this decomposition for a BTR-70 ground target in 2.5 Az×2.5 El degree Spatial sampling window. It may be noted that these eigenmodes form a complete basis set for database validation.

Let $\vec{X}$ represent a signature vector random process corresponding to a specified target in a 2.5°×2.5° aspect angle window. Therefore, $$\vec{X} = [X_1, X_2, \ldots X_M]^T \qquad (6)$$

where $X_i$, i=1, 2 . . . M are the random variables representing the signals in the M range bins. Let $\vec{X}$ be obtained using a computational process. Let $\vec{Y} = [Y_1, Y_2, \ldots Y_M]^T$ be the signature random process corresponding to the same target and aspect angle, but obtained by a different method, for instance by a measurement process. Validation of the database requires a comparison of the random processes $\vec{X}$ and $\vec{Y}$ to determine how "close" or "different" they are. Towards this end, the mutual information between $\vec{X}$ and $\vec{Y}$ may be used as a measure of similarity or lack thereof between them. The mutual information is defined as given below in equation (7).

$$I(\vec{X}; \vec{Y}) = h(\vec{X}) - h(\vec{X}/\vec{Y}) = h(\vec{X}) + h(\vec{Y}) - h(\vec{X}, \vec{Y}) \qquad (7)$$

In equation (7), $h(\vec{X})$ and $h(\vec{Y})$ represent the differential entropies of $\vec{X}$ and $\vec{Y}$, $h(\vec{X}/\vec{Y})$ is the conditional entropy and also is referred to as the equivocation of $\vec{X}$ given $\vec{Y}$, $h(\vec{X}, \vec{Y})$ is the joint differential entropy of $\vec{X}$ and $\vec{Y}$. The differential entropy $h(\vec{X})$ is defined in equation (8).

$$h(\vec{X}) = E[-\ln f(\vec{x})] = -\int f(\vec{x}) \ln(f(\vec{x})) d\vec{x} \qquad (8)$$

Here $f(\vec{x})$ is the probability density function of $\vec{X}$. $h(\vec{X})$ is expressed in units of Nats which is a logarithmic unit of information or entropy based on natural logarithms and powers of e rather than the powers of 2 associated with base 2 logarithms which define the Bit.

The high range resolution signature is a complex, vector, zero-mean Gaussian process whose probability density function is given by equations (9) and (10).

$$f_{\vec{x}}(\vec{x}) = \frac{1}{\pi^M |\det C_{\vec{x}}|} e^{-Q(\vec{x})} \quad (9)$$

and $$Q(\vec{X}) = \vec{X}^H C_{\vec{x}}^{-1} \vec{X} \quad (10)$$

$C_{\vec{x}} = E[(\vec{X}-\mu_{\vec{x}})(\vec{X}-\mu_{\vec{x}})^H]$ the covariance matrix of $\vec{X}$. For this case, a closed form expression for the differential entropy is easily obtained and is given by Eq. (11).

$$h(\vec{X}) = M \ln(e\pi) + \ln|\det C_{\vec{x}}| \quad (11)$$

Expressing the determinant of $$C_{\vec{x}} \text{ as } \det(C_{\vec{x}}) = \prod_{k=1}^{M} \lambda_k^x,$$

where $\lambda_k^x$ are the eigenvalues of the covariance matrix $C_{\vec{x}}$, $h(\vec{X})$ may be expressed as $$h(\vec{X}) = \sum_{k=1}^{M} \ln(\pi e \lambda_k^x). \quad (12)$$

Similarly, $h(\vec{Y})$ may be expressed as $$h(\vec{Y}) = \sum_{k=1}^{M} \ln(\pi e \lambda_k^y), \quad (13)$$

where $$\lambda_k^y, k = 1, 2 \ldots M$$

are the eigenvalues of the $C_{\vec{y}}$. Note that these expressions are for the complex signature processes of $\vec{X}$ and $\vec{Y}$. The joint entropy $h(\vec{X}, \vec{Y})$ may also be obtained by defining the vector $\vec{U} = [\vec{X}; \vec{Y}]$ and defining equation (14), the covariance matrix $C_{\vec{U}}$ $$C_{\vec{U}} = \begin{bmatrix} C_{\vec{x}} & C_{\vec{x}\vec{y}} \\ C_{\vec{x}\vec{y}}^H & C_{\vec{y}} \end{bmatrix}, \quad (14)$$

where $C_{\vec{x}\vec{y}}$ is the cross-covariance between $\vec{X}$ and $\vec{Y}$. Then $h(\vec{X}, \vec{Y})$ can be written as is shown in equation (15).

$$h(\vec{X}, \vec{Y}) = h(\vec{U}) = \sum_{k=1}^{2M} \ln(\pi e \lambda_k^U), \quad (15)$$

where $\lambda_k^U$, k=1, 2 ... 2M are the eigenvalues of $C_{\vec{U}}$. The expression for the mutual information is given by equation (16).

$$I(\vec{X}, \vec{Y}) = \ln \left[ \frac{\left(\prod_{k=1}^{M} \lambda_k^x\right)\left(\prod_{k=1}^{M} \lambda_k^y\right)}{\left(\prod_{k=1}^{2M} \lambda_k^U\right)} \right] \quad (16)$$

Equation 18 for mutual information requires the computation of the eigenvalues of $C_{\vec{x}}$, $C_{\vec{y}}$, and $C_{\vec{U}}$. However, when $C_{\vec{x}}$ and $C_{\vec{y}}$ are rank deficient, there are numerical issues that should be dealt with carefully. It can be shown that for any null eigenvalues of $C_{\vec{x}}$ and $C_{\vec{y}}$, there are always corresponding null eigenvalues of $C_{\vec{U}}$, resulting in the cancellation of singularities. Numerically, however, the eigenvalues are never exactly zero, leading to the subtraction of two large numbers. Such a procedure is not recommended. The following process computes mutual information that avoids any numerical difficulties and, in addition, provides significant insight into comparing two signature processes as herein claimed.

Let the two random processes $\vec{X}$ and $\vec{Y}$ be expressed in terms of their components along a basis set of orthonormal vectors. It is convenient to choose the eigenvectors of $C_{\vec{x}}$ or $C_{\vec{y}}$ as the basis. The choice of eigenvectors from $C_{\vec{x}}$ or $C_{\vec{y}}$ is a valid one when each covariance matrix is highly diagonalized and the eigenvalue sensitivity is low. This is articulated in detail and the Gershgorin Circle Theorem. Another possible choice is the basis set of vectors that simultaneously diagonalize both $C_{\vec{x}}$ and $C_{\vec{y}}$. Here, the eigenvectors of $C_{\vec{x}}$, denoted by $\hat{q}_k$, k=1, 2 ... M, are chosen. In this case, the spectral decomposition of $C_{\vec{x}}$ is expressed in equation (17).

$$C_{\vec{x}} = \sum_{k=1}^{M} \lambda_k \hat{q}_k \hat{q}_k^H. \quad (17)$$

Here $\lambda_k$, k=1, 2 ... M are the eigenvalues. The eigenvectors of $C_{\vec{x}}$ are a complete orthonormal set of basis vectors. Thus, $\vec{X}$ and $\vec{Y}$ may be expressed in equation (18) as equation (18).

$$\vec{X} = \sum_{k=1}^{M} \vec{S}_{xk} = \sum_{k=1}^{M} A_{xk} \hat{q}_k, \text{ and } A_{xk} = \hat{q}_k^H \vec{X} \quad (18)$$

$$\vec{Y} = \sum_{k=1}^{M} \vec{S}_{yk} = \sum_{k=1}^{M} A_{yk} \hat{q}_k, \text{ and } A_{yk} = \hat{q}_k^H \vec{Y}.$$

The random processes $A_{xk}$ and $A_{yk}$ are zero-mean Gaussian random processes and that in equation (19)

$$E(|A_{xk}|^2) = \sigma_{xk}^2 = \lambda_k^x \tag{19}$$

And equation (20)

$$E(|A_{yk}|^2) = \sigma_{yk}^2 = v_k^y. \tag{20}$$

While $$\lambda_k^x$$

are the eigenvalues of $C_{\vec{x}}$, $$v_k^y$$

are not the eigenvalues of $C_{\vec{y}}$. This is a result of adopting the eigenmodes of $C_{\vec{x}}$ as the basis. The random vectors $\vec{S}_{xk}$ and $\vec{S}_{yk}$ are referred to as the $k^{th}$ modes of $\vec{X}$ and $\vec{Y}$.

The mutual information of a sum of statistically independent processes is about equal to the sum of the mutual information of the corresponding processes. Thus, we need to consider only the mutual information of $\vec{S}_{xk}$ and $\vec{S}_{yk}$ as given by Eq. (21)

$$I(\vec{S}_{xk}; \vec{S}_{yk}) = h(\vec{S}_{xk}) + h(\vec{S}_{yk}) - h(\vec{S}_{xk}, \vec{S}_{yk}) = h(\vec{S}_{xk}) + h(\vec{S}_{yk}) - h(\vec{S}_{xyk}) \tag{21}$$

$$I(\vec{S}_{xk}; \vec{S}_{yk}) = h(\vec{S}_{xk}) + h(\vec{S}_{yk}) - h(\vec{S}_{xk}, \vec{S}_{yk}) \tag{21}$$

$$= h(\vec{S}_{xk}) + h(\vec{S}_{yk}) - h(\vec{S}_{xyk})$$

where $$\vec{S}_{xyk} = [\vec{S}_{xk}; \vec{S}_{yk}].$$

The covariance matrices for $\vec{S}_{xk}$ and $\vec{S}_{yk}$ are of the order M and are given by equations (22) and (23).

$$C_{\vec{x}_k} = E[\vec{S}_{xk} \vec{S}_{xk}^H] \tag{22}$$
$$= E(|A_{xk}|^2) \hat{q}_k \hat{q}_k^H$$
$$= \lambda_k^x \hat{q}_k \hat{q}_k^H$$

$$C_{\vec{y}_k} = E[\vec{S}_{yk} \vec{S}_{yk}^H] = E(|A_{yk}|^2) \hat{q}_k \hat{q}_k^H = v_k^y \hat{q}_k \hat{q}_k^H \tag{23}$$

Clearly both $C_{\vec{x}_k}$ and $C_{\vec{y}_k}$ are rank one matrices with only one non-zero eigenvalue and (M−1) zero eigenvalues. The entropies $h(\vec{S}_{xk})$ and $h(\vec{S}_{yk})$ are given by $$h(\vec{S}_{xk}) = \ln(\pi e \lambda_k^x) + (M-1)$$

singularities (corresponding to the null eigenvalues of $C_{\vec{x}_k}$) and $$h(\vec{S}_{yk}) = \ln(\pi e v_k^y) + (M-1)$$

singularities (corresponding to the null eigenvalues of $C_{\vec{y}_k}$).

Presently, it will be shown that $h(\vec{S}_{xyk})$ has 2(M−1) singularities corresponding to the 2(M−1) null eigenvalues of $C_{\vec{x}_k \vec{y}_k}$.

The vector $\vec{S}_{xyk}$ may conveniently be expressed as is given in equation (24)

$$\vec{S}_{xyk} = \begin{bmatrix} \vec{S}_{xk} \\ \vec{S}_{yk} \end{bmatrix} = \begin{bmatrix} A_{xk} \hat{q}_k \\ A_{yk} \hat{q}_k \end{bmatrix} = \vec{A}_{xyk} \otimes \hat{q}_k, \tag{24}$$

where $\vec{A}_{xyk} = [A_{xk}, A_{yk}]^T$ and $\otimes$ indicates the Kronecker product. Then the covariance matrix $C_{\vec{x}_k \vec{y}_k}$ is given in (25) as $$C_{\vec{x}_k \vec{y}_k} = E[\vec{S}_{xyk} \vec{S}_{xyk}^H] =$$
$$E[(\vec{A}_{xyk} \otimes \vec{q}_k)(\vec{A}_{xyk}^H \otimes \vec{q}_k^H)] =$$
$$E[(\vec{A}_{xyk} \vec{A}_{xyk}^H) \otimes (\hat{q}_k \hat{q}_k^H)] =$$
$$[A_{xyk} A_{xyk}^H] \otimes \hat{q}_k \hat{q}_k^H = C_{\vec{A}} \otimes \hat{q}_k \hat{q}_k^H, \tag{25}$$

where $$C_{\vec{A}} = E\left[\vec{A}_{xyk} \vec{A}_{xyk}^H\right]$$

is a 2×2 matrix. The eigenvalues and eigenvectors of $C_{\vec{x}_k \vec{y}_k}$ may be obtained using mathematical methods known in the art.

Since $$C_{\vec{x}_k \vec{y}_k} = C_{\vec{A}} \otimes \hat{q}_k \hat{q}_k^H,$$

where $C_{\vec{A}}$ is a 2×2 matrix and $$\hat{q}_k \hat{q}_k^H$$

is an M×M matrix, there are 2M eigenvalues and corresponding eigenvectors given by $$\alpha_{ij} = \tilde{\lambda}_i \xi_j, i=1,2 \text{ and } j=1,2 \ldots M$$

and $\hat{\chi}_{ij} = \hat{\theta}_i \otimes \hat{\omega}_j, i=1,2$ and $j=1,2 \ldots M$, where $\tilde{\lambda}_i$ and $\hat{\theta}_i$=1, 2 are the two eigenvalues and eigenvectors of $C_{\vec{A}}$ and $\xi_i$ and $\hat{\omega}_i$, i=1, 2 … M are the M eigenvalues and eigenvectors of $$\hat{q}_k \hat{q}_k^H$$

respectively. However, noting that $$\hat{q}_k \hat{q}_k^H$$

is a rank one matrix, there is only one non-zero eigenvalue, $\xi_1=1$ and (M−1) zero eigenvalues. Thus, $C_{\vec{x}\vec{y}_k}$ has two non-zero eigenvalues $\tilde{\lambda}_1$ and $\tilde{\lambda}_2$, the two eigenvalues of $C_{\vec{A}}$, and 2(M−1) null eigenvalues.

The differential entropy $h(\vec{S}_{xk}, \vec{S}_{yk})$ may now be written as $h(\vec{S}_{xk}, \vec{S}_{yk}) = \ln(\pi e\tilde{\lambda}_1) + \ln(\pi e\tilde{\lambda}_2) + 2(M-1)$ singularities.

It may be noted that the logarithmic singularities are due to the null eigenvalues. The mutual information $I(\vec{S}_{xk}; \vec{S}_{yk})$ may now be written as $$\left| \left( \vec{S}_{xk}; \vec{S}_{yk} \right) \right| = \ln(\pi e \lambda_k^x) + (M-1) \text{ singularities} + \ln(\pi e v_k^y) +$$
$$(M-1) \text{ singularities} - \ln\left(\pi^2 e^2 \tilde{\lambda}_1 \cdot \tilde{\lambda}_2\right) - 2(M-1) \text{ singularities}.$$

This mutual information for the $k^{th}$ mode can be expressed as Eq. (26)

$$\left| \left( \vec{S}_{xk}; \vec{S}_{yk} \right) \right| = \ln\left[ \frac{\lambda_k^x v_k^y}{\tilde{\lambda}_1 \tilde{\lambda}_2} \right]. \tag{26}$$

It can now be seen that the singularities of $h(\vec{S}_{xk})$ and $h(\vec{S}_{yk})$ are cancelled exactly by the singularities of $h(\vec{S}_{xk}, \vec{S}_{yk})$ as all the singularities are of the same order. With this computational process all numerical difficulties due to singularities are eliminated.

It is possible to get a simple closed form expressions for $\tilde{\lambda}_1$ and $\tilde{\lambda}_2$. Consider Eq. (27)

$$C_{\vec{A}} = E\left[\vec{A}_{xyk} \vec{A}_{xyk}^H\right] = \begin{bmatrix} E(|A_{xk}|^2) & E(A_{xk} A_{yk}^*) \\ E(A_{xk}^* A_{yk}) & E(|A_{yk}|^2) \end{bmatrix} = \begin{bmatrix} \sigma_{xk}^2 & \delta_{xyk} \cdot \sigma_{xk} \cdot \sigma_{yk} \\ \delta_{xyk}^* \cdot \sigma_{xk} \cdot \sigma_{yk} & \sigma_{yk}^2 \end{bmatrix}, \tag{27}$$

where $\delta_{xyk}$ is the correlation between $A_{xk}$ and $A^*_{yk}$ and $\sigma_{xk} \cdot \sigma_{yk}$ is the product of the of standard deviations associated with $A_{xk}$ and $A_{yk}$. The modeled signature processes $\vec{X}$ and $\vec{Y}$ in equation (18) provide ordered pair data that can be directly applied to compute $\delta_{xyk}$. For this 2×2 matrix, the eigenvalues may be readily determined and are given by Eq. (28)

$$\tilde{\lambda}_{1,2} = \left( \frac{\sigma_{xk}^2 + \sigma_{yk}^2}{2} \right) \pm \frac{1}{2} \left[ (\sigma_{xk}^2 + \sigma_{yk}^2) - 4\sigma_{xk}^2 \cdot \sigma_{yk}^2 (1 - |\delta_{xyk}|^2) \right]^{1/2}. \tag{28}$$

The product $\tilde{\lambda}_1 \tilde{\lambda}_2$ may then be simplified to Eq. (29)

$$\tilde{\lambda}_1 \cdot \tilde{\lambda}_2 = \sigma_{xk}^2 \cdot \sigma_{yk}^2 (1 - |\delta_{xyk}|^2) \tag{29}$$
$$= \lambda_k^x \cdot v_k^y (1 - |\delta_{xyk}|^2).$$

Finally, the modal mutual information simplifies to the expression in equation (30).

$$\left| \left( \vec{S}_{xk}; \vec{S}_{yk} \right) \right| = -\ln[1 - |\delta_{xyk}|^2]. \tag{30}$$

Some special cases are of interest. When the Gaussian processes $\vec{S}_{xk}$ and $\vec{S}_{yk}$ are highly correlated such that $|\delta_{xyk}| \to 1$, the modal mutual information tends to ∞. When these processes are un-correlated such that $|\delta_{xy}| \to 0$, the mutual information tends to zero as well.

That is as it should be since uncorrelated Gaussian processes are statistically independent and the mutual information between independent processes is zero. Indeed, modal mutual information may be considered to be a sensitive indicator of statistical independence and it is this fact that is of importance in using mutual information for database validation within the context of the target discrimination problem.

Figure 6:
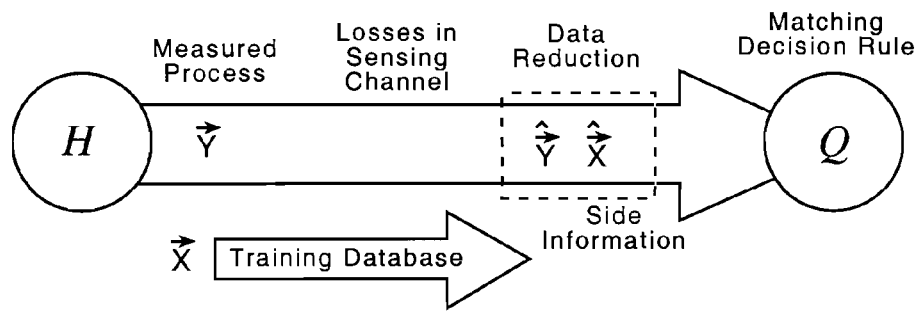
FIG. 6 is an illustration of an information theoretic radar channel model.

The evaluation of the similarity between the algorithm training process $\vec{X}$ and the sensor measured process $\vec{Y}$ may be viewed within a systems model depicting the information flow through the signature sensing and processing components of a radar system as shown in FIG. 6. FIG. 6 shows a continuum relationship between a true state H of a target under measurement and a decision state Q of a matching algorithm MA, which provides the matching decision rule. This relationship is the basis for performance characterization.

The mutual information between H and Q, I(H; Q), can be related to the probability of error (for binary decision rules) using Fano's Inequality shown in equation (31).

$$H(H) - I(H;Q) \leq H(P_e) \tag{31}$$

The operation H(p) is the discrete entropy of the respective discrete random variable p. The Data Processing inequality tells us that information in the Markov Chain $H \Rightarrow \vec{Y} \Rightarrow \hat{\vec{Y}} \Rightarrow Q$ cannot be created; only lost in this channel. The injection of side information (training information) $\vec{X}$ in the $\hat{\vec{Y}}$ space does not affect the Markov nature of $H \Rightarrow \vec{Y} \Rightarrow \hat{\vec{Y}} \Rightarrow Q$. Information losses within the channel can be attributed to various sources including the signature measurement process, signature signal processing, signature dimensionality reduction-feature selection, decision rule application, and the dissimilarity between a sensor measured signature process $\vec{Y}$ and a "training" signature process $\vec{X}$. The information loss associated with the dissimilarity between $\vec{X}$ and $\vec{Y}$ can be expressed using the Data Processing Inequality as shown in equation (32).

$$I(H;Q) \leq I(H;\hat{\vec{Y}}) \leq \leq I(H,\vec{Y}) \leq I(H;H) \tag{32}$$

For example, the mutual information between the target state random variables H and the sensor measurement signature process $\vec{Y}$ is greater than the mutual information between H and the target signature feature process (reduced dimensionality from $\vec{Y}$) $\hat{\vec{Y}}$ and likewise $I(H; \hat{\vec{Y}})$ is greater than $I(H; Q)$. The losses incurred in the automatic target recognition matching process associated with a dissimilarity between the distribution of the training feature database $\hat{\vec{X}}$ and the distribution of the sensor measured signature feature process $\hat{\vec{Y}}$ are captured within the difference between $I(H; \vec{Y}) - I(H; \hat{\vec{Y}})$. The lower dimensional subspace of $\vec{Y}$ ($\hat{\vec{Y}}$) is formed through the use of side information $\vec{X}$ to form the basis of $\hat{\vec{Y}}$ as derived above. Thus the system performance loss associated with the dissimilarity between $\vec{X}$ and $\vec{Y}$ is characterized by the use of the basis of $\vec{X}$ in the decomposition of the process $\vec{Y}$.

The use of relative entropy directly to interpret the distance between $\vec{X}$ and $\vec{Y}$ in terms of the measure l(H; Q) is complicated by the fact that mutual information is not a "true" distance between distributions since it is not symmetric and does not satisfy the triangle inequality. Although relative entropy (and thus mutual information) is not a metric, D(p||q) does in some circumstances behave like the square of the Euclidean distance and under these conditions convergence in relative entropy implies convergence in the $L_1$ norm. Further development of mutual information in this context as a means to formally interpret l($\vec{X}$; $\vec{Y}$) in terms of l(H;Q) and the loss on $P_e$ is important and is the subject of ongoing efforts by the authors.

The emphasis of the work presented here is the exploration of the strength of modal mutual information as physics based similarity measure in the context of the unique automatic target recognition problem and within the advantages afforded by the reduced dimensional feature space of an eigen-decomposition.

It is desirable that the modal mutual information, which is being used as the measure of similarity, be high between the signatures of two targets drawn from the same class but with some variations, be they small or significant. At the same time it is desired that the mutual information between the signatures of two targets drawn from two different classes be low, even if these two target classes are considered to be "confusers" based on conventional algorithms. Any measure of similarity should be able to "ignore" in-class variations of signatures of targets drawn from the same class and have a high value while at the same time yield a low value for the signatures of two targets drawn from different classes, even if the signatures appear "close" by conventional classification algorithm measures. It is further desired that the "low" and "high" values of modal mutual information be well separated so that a decision boundary between these two values is easily determined. Well separated is preferably by a factor of five (5) and in one embodiment of the present invention an order of magnitude. The degree of statistical dependence between two target signature processes will be a function of how similar the statistics are as captured by the scintillation of the complete physical scattering of each target. Targets that physically present electrically similar scattering mechanisms will produce high degrees of dependence. Targets that physically present electrically dissimilar scattering mechanisms will produce low degrees of dependence. The results of a number of numerical simulations and experiments demonstrate that the modal mutual information exhibits this characteristic and meets these requirements.

Table I given below lists a number of experiments arranged into two categories. The first category comprising case-1 and case-2 experiments consider the comparison of signatures of out-of-class dissimilar targets.

TABLE I

SUMMARY OF EXPERIMENTS

| EXPERIMENT Cases 1-6 | HYPOTHESIS | MI, Nats |
|---|---|---|
| 1. 'Dissimilar Out-of-Class Targets | Underlying target scattering source will generate independent random signatures | .4 |
| 2. 'Confuser' Out-of-Class Targets | Underlying target scattering source will generate independent random signatures | .2 |
| 3. Similar In-Class Variation of Targets With Ground Plane Removed | Underlying target scattering source will generate dependent random signatures | 10.5 |
| 4. Similar In-Class Variation of Targets Using Scattering Center Decimation | Underlying target scattering source will provide dependency with in-class variation due to distributed scattering source differences | 6 |
| 5. Similar In-Class Variation of Targets Using Removal of Persistent Physical features | Underlying target scattering source will provide dependency with scattering source variation due to significant geometry differences | 11 |
| 6. Incremental Addition of Complex Gaussian Signal | Underlying target scattering structure will generate dependent random signatures | 8-20 |

Figure 7:
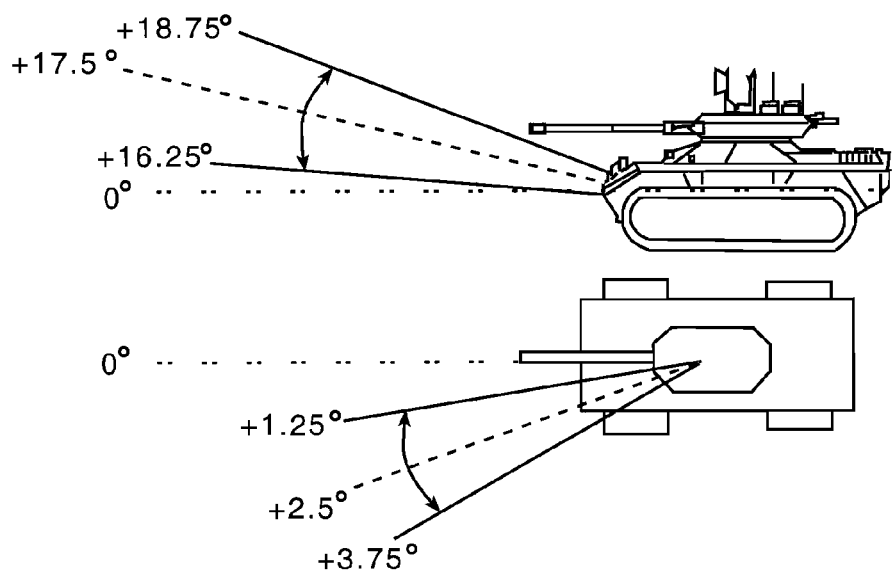
FIG. 7 is an illustration of a target aspect field of view.

All the signature sets considered here are obtained using electromagnetic prediction codes and were predicted at one foot resolution. The targets considered here are typical ground targets designated as BMP2 (infantry combat vehicle), BDRM (armored ground vehicle), BTR-70 (armored personnel carrier), and T-72 (main battle tank) and are taken to be on a perfect electrically conducting (PEC) ground plane (unless otherwise stated) using vertical polarization. The signature sets are taken over a 2.5°×2.5° azimuth/elevation window about the target aspect angle of 2.5° azimuth and 17.5° elevation as shown in FIG. 7.

Total mutual information is computed as the cumulative sum of modal mutual information. In the experiments below, all total mutual information values provided are based on the sum of the modal mutual information associated with all the modes required to capture 98% of the signature power in both target signature processes.

Figure 8:
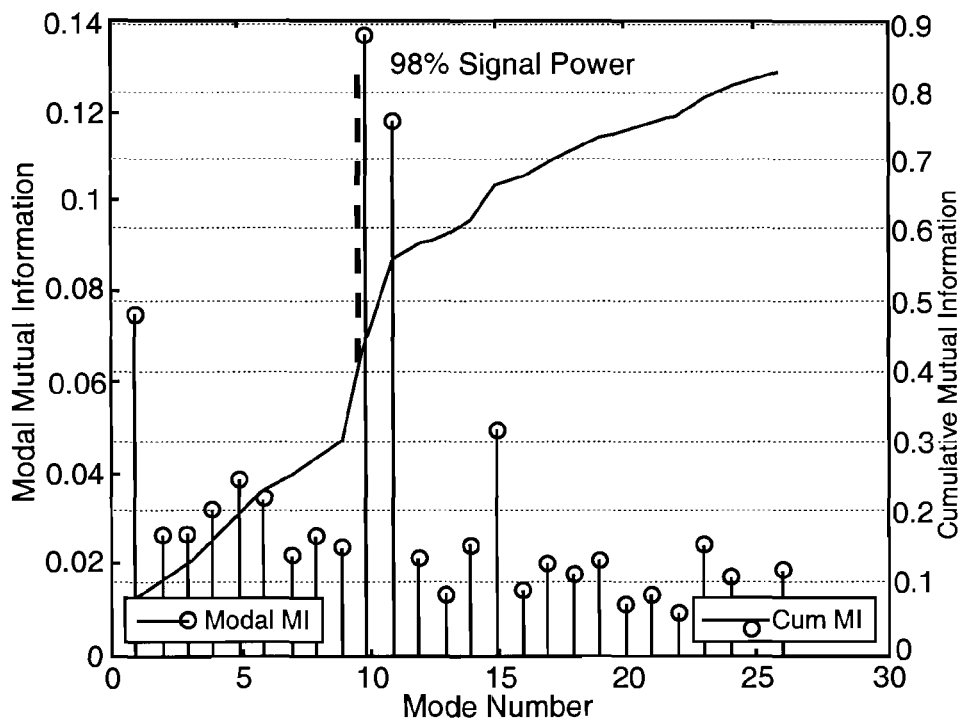
FIG. 8 is a graphical illustration of baseline MMI and cumulative MI for BTR-70 & BMP2, Cumulative MI of 0.4.

The experiment corresponding to case-1 of Table I pertains to two targets (BTR-70 and BMP2) drawn from two different target classes. The mutual information between the signatures of dissimilar targets would be expected to be low as these signatures would be statistically independent. In FIG. 8 the modal mutual information for the 'out-of-class' target case yields consistently low mutual information across the modes and the total mutual information is also quite low at approximately 0.4 Nats. Confirming expectations, this low value of mutual information is consistent with the degree of statistical independence to be expected when the signature processes of two very dissimilar scattering sources (targets) are compared.

Figure 9:
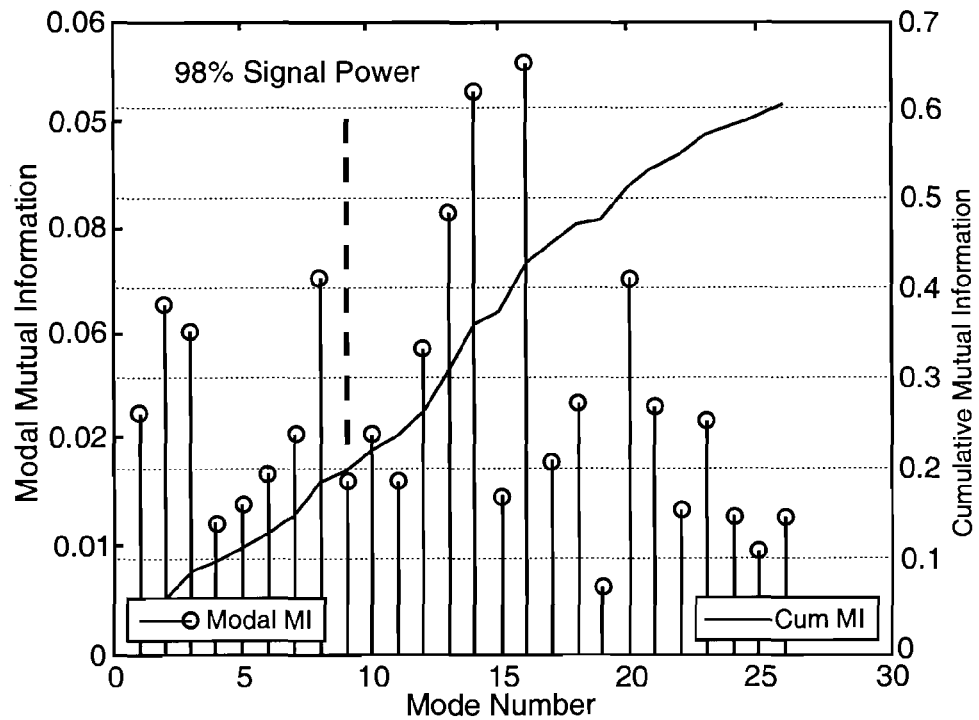
FIG. 9 is a graphical illustration of MMI and cumulative MI for BTR-70 & BDRM; confuser case, cumulative MI of 0.2 Nats.

In the case-2 experiment of Table I, the previous experiment is extended to conditions where current classification algorithm approaches (those based on geometric measure) indicate that the two targets drawn from two different classes are 'close' and often are confused with one another. The BTR-70 and the BRDM are known to be "confusers" in that sense within the regions under evaluation here. FIG. 9 shows the modal mutual information and cumulative MI for BTR-70 & BDRM in a Confuser Case with a Cumulative MI of 0.2 Nats. With the cumulative MI between the two target signature processes at approximately 0.2 Nats, the results in FIG. 9 show clearly that for even this "confuser" case, the low values of modal and cumulative MI indicate a high degree of independence that is consistent with scattering phenomena taking place on targets from different target classes. This requirement would be a challenging test for any measure of statistical similarity. The modal mutual information measure achieves this desirable result in part because it is a good indicator of statistical independence between two random signature processes. The degree of independence is related to how similar the changing physical scattering (as a function of aspect angle) is between each signature process. Thus the similarity is based on the level of agreement inherent in the statistics captured by the scintillation of the complete physical scattering of each target and not on statistics based on a limited feature representation.

Figure 10:
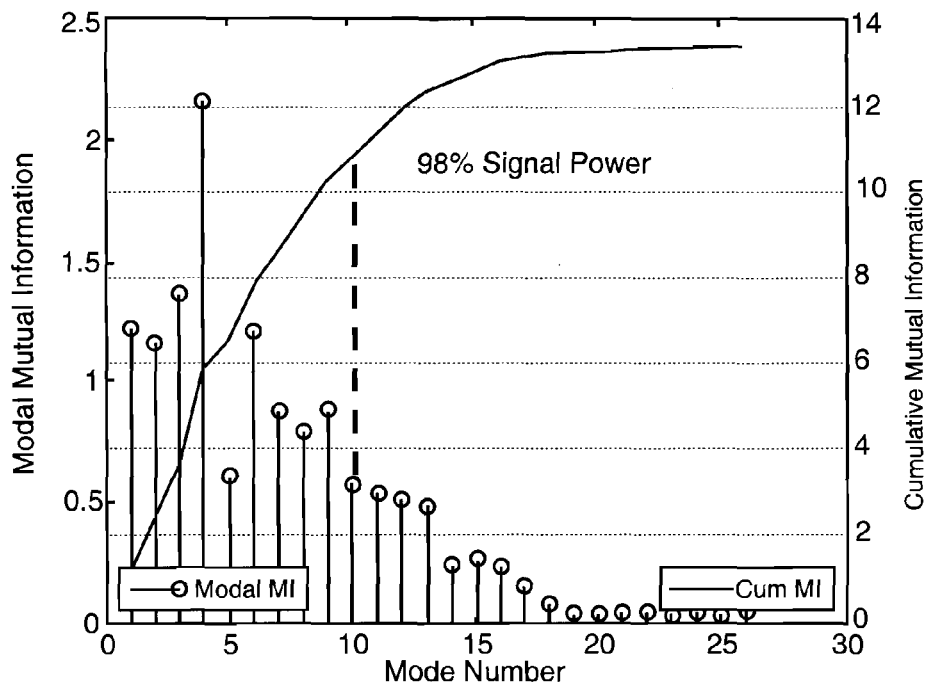
FIG. 10 is a graphical illustration of MMI and cumulative MI for BTR-70 with ground plane & BTR-70 without ground plane; similar target case, cumulative MI of 10.5 Nats.

Two targets from the same class are often not identical. The physical differences can be "minor" or quite striking. A number of experiments pertaining to the modal and cumulative mutual information of in-class targets with different degrees of variations are considered. Case-3 of Table I corresponds to the signatures of the BTR-70 with and without the PEC ground plane representing a "minor" difference. For this case, the mutual information is expected to be high and is so demonstrated by the results shown in FIG. 10 with the cumulative mutual information at 10.5 Nats. FIG. 10 shows modal mutual information and Cumulative mutual information for BTR-70 With Ground Plane & BTR-70 Without Ground Plane, a similar target case.

The target signature may be considered to be the sum of scattering from a collection of scattering centers. Variations in target and signatures, ranging from "marginal" to "major" can be simulated by including or not including chosen groups of scattering centers. In-class variations are often the result of certain physical features being removed from or added to a basic target configuration. For example, fuel barrels may be added or removed from a tank. Or, there may be tanks which have one of its parts obscured, while others do not experience such obscuration.

Figure 11:
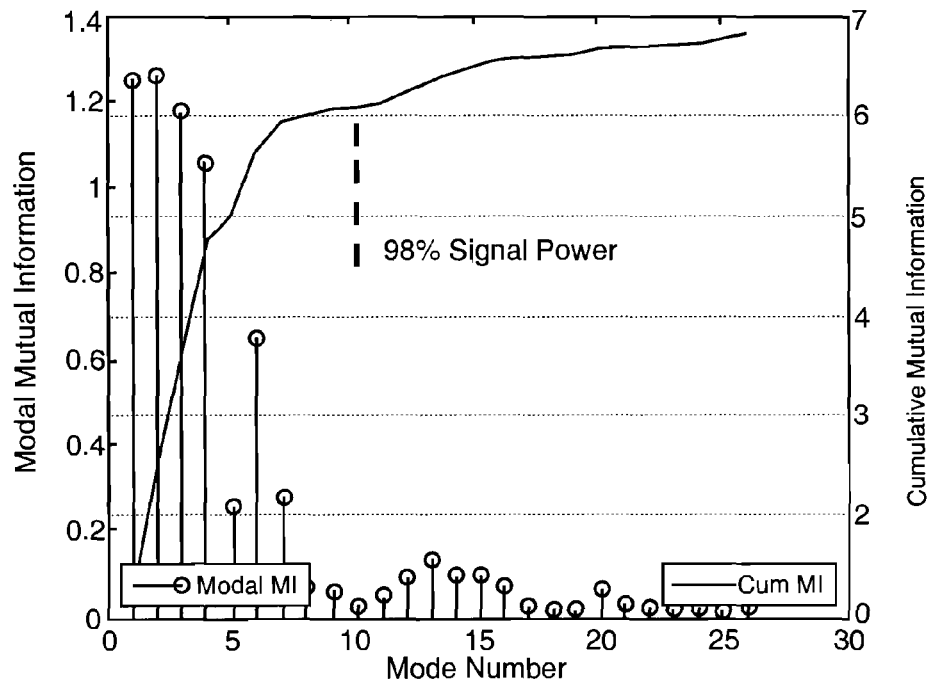
FIG. 11 is a Modal MI and Cumulative MI for BTR-70 Baseline & BTR-70 with Top 20 Scattering Centers Only, Cumulative MI of 6 Nats.

The uncertainty in computational signature processes can result from reduced detail within the modeling and prediction process. Analyzing the behavior of mutual information with respect to reduced scatter representation is one way to study this area. In the experiment corresponding to case-4 of Table I, a number of scattering centers are decimated to test the suitability of mutual information as a measure of similarity. A favorable result would indicate that small deviations or omissions of small scattering detail would not impact the measure of similarity. In this experiment the modal mutual information between the baseline BTR-70 and a decimated version of the BTR-70 comprising the top 20 (amplitude ranking) scattering centers is determined. The results shown in FIG. 11 indicate a cumulative mutual information between the signature processes to be a high value of approximately 6 Nats. Such a high value suggests that the modal mutual information, used here as a measure of similarity, correctly identifies the target with decimated scattering centers as an in-class target, despite the loss of some detail. This robustness with respect to the inevitable variations in the signatures of in-class targets is important in addressing issues associated with articulation and target configuration.

In-class variations from the baseline geometry may be obtained by removing certain physical features and an effort is made to ensure that the scattering from these features is "persistent" over the whole target aspect angle window. The T-72 tank is used as the baseline target in the experiments designated as case-5 in Table I with three specific geometry components identified for study. The geometry components identified are the forward fenders, rear fuel barrels, and the gun barrel. The scattering from the front fender is eliminated and FIG. 12 illustrates the two dimensional image of the T-72 tank with and without the fender scattering. The reduction in resolved signal power within the cells associated with this geometry indicates the significant effect of eliminating the fender scattering. The results of this first of these sub-experiments are presented in FIG. 13 where the modal mutual information is computed for the T-72 with and without fender scattering. The cumulative mutual information is computed as approximately 16 Nats indicating a high degree of similarity.

Figure 18:
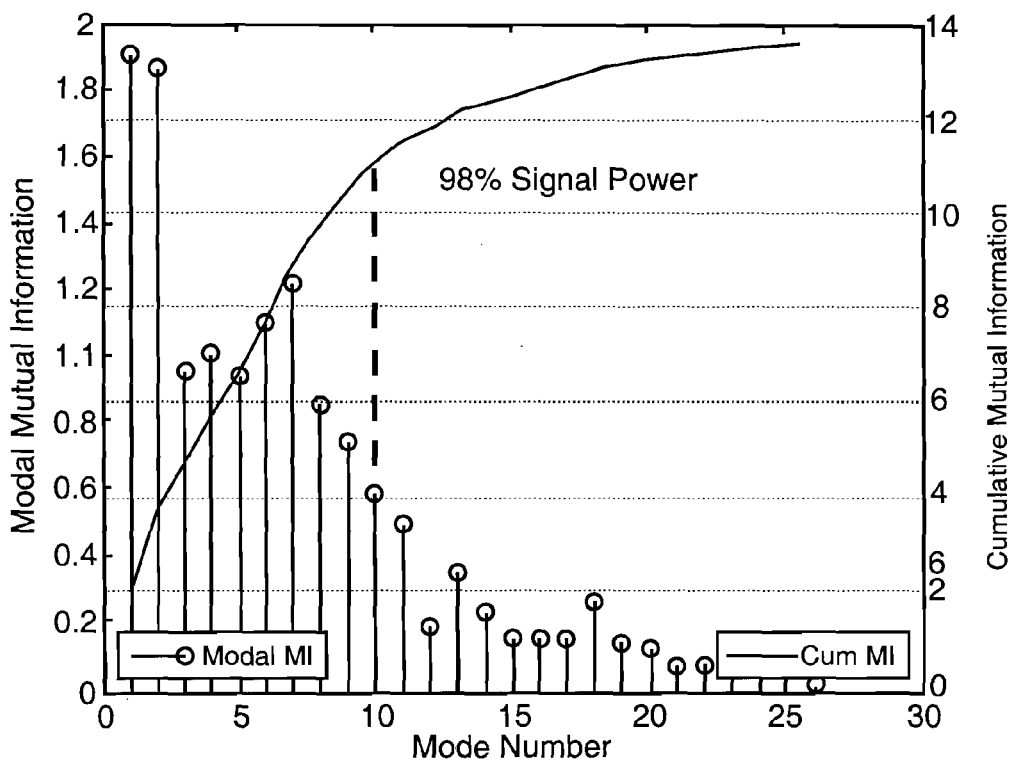
FIG. 18 is a graphical illustration of Modal MI and Cumulative MI for Baseline T-72 and T-72 without Fenders, Fuel Barrel, and Gun Barrel Scattering, Cumulative MI of 11 Nats.

FIGS. 14 through 17 show similar results for the sub-experiments involving the removal of the fuel barrel scattering in FIG. 14 and FIG. 15 and the gun barrel scattering with and without the barrel in FIG. 16 and FIG. 17. The cumulative mutual information for the T-72 with and without fuel barrel scattering is approximately 14 Nats indicating again a high degree of similarity. The third sub-experiment results show the cumulative mutual information for the T-72 with and without gun barrel scattering to be 12 Nats indicating again a high degree of similarity. In the final sub-experiment for case-5, all three physical features are removed (fenders, fuel barrels and gun removed). In FIG. 18 we see that the cumulative mutual information for the baseline T-72 and this modified T-72 is approximately 11 Nats.

Mutual information used as a measure of similarity correctly identifies the modified targets in all cases. Further, the mutual information remains high even when geometry that is deemed important in statistical pattern recognition based discrimination methods is removed.

Figure 19:
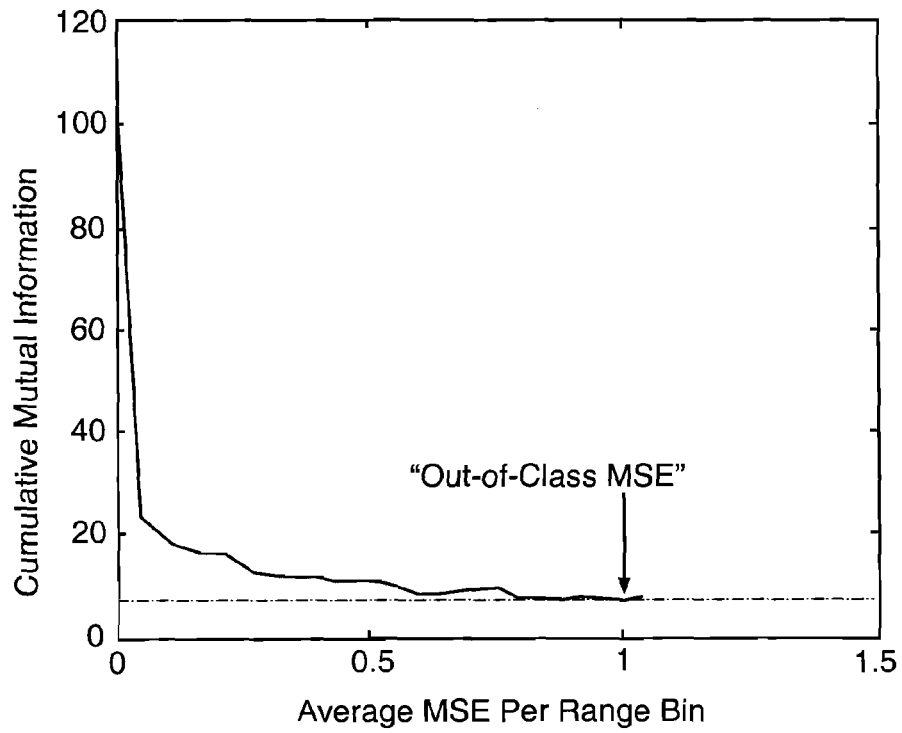
FIG. 19 is a graphical illustration of Modal MI Versus MSE for Baseline BMP2 and BMP2 with Additive Gaussian Signal Demonstrating Dependence at Significant Levels of Added Distortion.

Experiments conducted so far show that mutual information remains high for a range of in-class variations and is close to zero for out of class targets, even when they appear "close" by other measures. It is natural to wonder if it is possible to make so many changes in the baseline target that the modified target could be considered a dissimilar target resulting in a mutual information level close to zero. To test this notion and starting with the signature process of a baseline target (BMP2), a new signature process is obtained by the addition of uncorrelated Gaussian signal. The mean squared error (MSE) between the modified and baseline signatures serves as a measure of "distortion." FIG. 19 shows the cumulative mutual information as function of the mean squared error for Baseline BMP2 and BMP2 with additive Gaussian signals demonstrating dependence at significant levels of added distortion. The salient feature of FIG. 19 is that as the mean squared error (MSE) increases, to a level typical of dissimilar targets, the mutual information levels off but does not really become zero. The reason for this behavior is that irrespective of the amount of "distortion" added to the original signature, the modified signature never becomes an independent process. Mutual information is zero only when the two processes are independent. It is this property of mutual information that leads to the desirable result of it being high for a rather wide range of in-class variations but is low for out-of class variations.

The role of signature database validation is significant in achieving realizable radar signature exploitation systems. Developing similarity measures that operate within an automatic target recognition systems framework is central to building this technology. The research and key findings associated with an information theoretic similarity measure to provide a high range resolution signal model. The database in one embodiment of the present invention includes measured field data and modeled synthetic data where the field data is compared to the synthetic data and mathematically combined to create a synthetic signature set using the above computated modal mutual information and/or mutual information. In one embodiment of the present invention the synthetic signature set includes both similar targets and dissimilar targets. The synthetic signature set in one embodiment of the present invention is automatically compared with the target signature to provide automatic target recognition based upon the above modal mutual information calculations.

Computationally stable techniques for computing modal mutual information are herein disclosed for use in radar and multi-radar signature database validation. Numerical experiments have been conducted to validate the approach taken and to demonstrate that modal mutual information can be used to determine if two signature processes correspond to in-class or out of class targets.

Experimentally it was shown that MI is consistently high between signatures corresponding to targets with in-class variations and consistently low (independent) for out of class target comparisons, including the 'confuser' case. While the full interpretation of mutual information's ability to measure the common signature scattering information has not been fully studied, the inherent capability to test for statistical independence is useful. The apparent 'sharpness' of the modal mutual information as a measure of statistical independence is compatible with efficient methods of hypothesis testing and training which will be needed to fully realize the measure in assessing a signature process for use within an automatic target recognition system.

Modal mutual information provides an improved test measurement for radar. Other applications may include radar integrated with an automatic target recognition systems database. In addition to this, the characteristics of mutual information have strong appeal in dealing with real word artifacts of contemporary radar signature data. The ability of mutual information to determine the common information between two signature processes even with the addition of large levels of additive Gaussian signal shows great promise to operate in high interference and noise conditions, often experienced in measured radar signature data. Potential solutions to today's troublesome issues of uncertainty in signature alignment and calibration faced by many feature based similarity approaches may be better addressed with the process herein disclosed.

Regardless of the dimensionality and the bandwidth of the automatic target recognition signature process, this method of statistical database comparison for signature processes within the 1D domain may be applied to signatures in higher dimensions and at higher resolution (projecting to lower dimension and with reduced bandwidth) in order to address issues within the database area.

While specific embodiments have been described in detail in the foregoing description and illustrated in the drawings, those with ordinary skill in the art may appreciate that various modifications to the details provided could be developed in light of the overall teachings of the disclosure.

What is claimed is:

1. A method of assessing radar signature databases for use in training a radar target recognition decision algorithm, the method comprising the steps of:

generating radar signature data from at least three targets using a first process and a second process, wherein the radar signature data includes at least one of actual radar measurements and synthetic radar measurements, the synthetic radar measurements being generated using numerical simulation, and wherein the targets comprise at least two different target classes, at least two targets being in a same target class and at least one target being in a different target class;

producing a first radar signature database using the first process and a second radar signature database using the second process;

comparing the first radar signature database and the second radar signature database using an information theory;

computing an amount of cumulative modal mutual information, M, between the first radar signature database and second radar signature database for targets comprising the same target class and for targets comprising different target classes, wherein the computation comprises a numerical stability calculation to remove singularities; and based on the amount of cumulative modal mutual information between the first radar signature database and the second radar signature database for targets comprising the same target class, determining whether the first process and second process are suitable for use together to generate a hybrid radar signature database for training the radar target recognition decision algorithm.

2. The method of claim 1 wherein M is at least about five times greater when the targets comprise the same target class as compared to when the targets comprise different target classes.

3. The method of claim 1 wherein $M \geq 5$ Nats when the targets comprise the same target class.

4. The method of 3 wherein the targets include at least one target comprising at least one in-class structural variation.

5. The method of claim 1 wherein $0 \leq M \leq 1$ when the targets comprise different target classes.

6. The method of claim 5 wherein the targets include at least one target comprising at least one out-of-class structural variation.

7. The method of claim 1 wherein the radar signature data is high range resolution signature data.

8. The method of claim 1 wherein the radar target recognition decision algorithm is used in a plurality of automatic target recognition systems, wherein the automatic target recognition systems comprise at least one of an air-to-air sensor system and an air-to-ground sensor system.

* * * * *